United States Patent
Yamasaki et al.

(10) Patent No.: US 12,125,646 B2
(45) Date of Patent: Oct. 22, 2024

(54) CAPACITOR ELEMENT AND ELECTROLYTIC CAPACITOR

(71) Applicant: Panasonic Intellectual Property Management Co., Ltd., Osaka (JP)

(72) Inventors: Kazuya Yamasaki, Kyoto Fu (JP); Shinji Kondou, Kanagawa Ken (JP); Hitoshi Ishimoto, Hyogo Ken (JP); Yukihiro Shimasaki, Hyogo Ken (JP); Yuji Miyachi, Saga Ken (JP); Kohei Yamaguchi, Saga Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 17/799,578

(22) PCT Filed: Feb. 22, 2021

(86) PCT No.: PCT/JP2021/006632
§ 371 (c)(1),
(2) Date: Aug. 12, 2022

(87) PCT Pub. No.: WO2021/172272
PCT Pub. Date: Sep. 2, 2021

(65) Prior Publication Data
US 2023/0070969 A1 Mar. 9, 2023

(30) Foreign Application Priority Data

Feb. 28, 2020 (JP) .................. 2020-032533
Feb. 28, 2020 (JP) .................. 2020-032534

(51) Int. Cl.
*H01G 9/042* (2006.01)
*H01G 9/048* (2006.01)
*H01G 9/15* (2006.01)

(52) U.S. Cl.
CPC .......... *H01G 9/0425* (2013.01); *H01G 9/048* (2013.01); *H01G 9/15* (2013.01)

(58) Field of Classification Search
None
See application file for complete search history.

(56) References Cited

U.S. PATENT DOCUMENTS 6,381,121 B1 * 4/2002 Monden ................ H01G 9/025
252/62.2
2006/0114645 A1 * 6/2006 Takatani ............... H01G 9/042
361/523

(Continued)

FOREIGN PATENT DOCUMENTS

CN 101409153 A * 4/2009
JP 2001217159 A * 8/2001

(Continued)

OTHER PUBLICATIONS

Translation CN 101409153A.*

(Continued)

*Primary Examiner* — Eric W Thomas
(74) *Attorney, Agent, or Firm* — Rimon P.C.

(57) ABSTRACT

A disclosed capacitor element includes: a first electrode; a dielectric layer covering at least a portion of the first electrode; and a second electrode covering at least a portion of the dielectric layer. The second electrode includes a solid electrolyte layer, a conductive carbon layer covering at least a portion of the solid electrolyte layer, and a metal paste layer covering at least a portion of the carbon layer. The carbon layer includes flake carbon particles and spherical carbon particles. A particle diameter of the spherical carbon particles is less than an average major diameter of the flake carbon particles, or greater than or equal to the average major diameter of the flake carbon particles.

14 Claims, 4 Drawing Sheets

(56) References Cited

U.S. PATENT DOCUMENTS

| | | |
|---|---|---|
| 2021/0125787 A1 | 4/2021 | Waoka et al. |
| 2021/0193395 A1 | 6/2021 | Koseki et al. |
| 2023/0029692 A1* | 2/2023 | Koseki .................. H01G 9/055 |

FOREIGN PATENT DOCUMENTS

| JP | 2006-140142 A | | 6/2006 |
|---|---|---|---|
| JP | 2008-028137 A | | 2/2008 |
| JP | 2008186841 A | * | 8/2008 |
| WO | 2019/167774 A1 | | 9/2019 |
| WO | 2019/240041 A1 | | 12/2019 |

OTHER PUBLICATIONS

Translation JP 2008186841A.*
International Search Report issued in International Patent Application No. PCT/JP2021/006632 mailed May 11, 2021; with English translation.

* cited by examiner

CAPACITOR ELEMENT AND ELECTROLYTIC CAPACITOR

CROSS-REFERENCE OF RELATED APPLICATIONS

This application is the U.S. National Phase under 35 U.S.C. § 371 of International Patent Application No. PCT/JP2021/006632, filed on Feb. 22, 2021, which in turn claims the benefit of Japanese Patent Application No. 2020-032533, filed on Feb. 28, 2020, and Japanese Patent Application No. 2020-032534, filed on Feb. 28, 2020, the entire disclosures of which Applications are incorporated by reference herein.

TECHNICAL FIELD

The present invention relates to a capacitor element and an electrolytic capacitor, and particularly to an improvement of a carbon layer.

BACKGROUND ART

A capacitor element usually includes a first electrode, a dielectric layer formed on the first electrode, and a second electrode formed on the dielectric layer. The second electrode usually includes a solid electrolyte layer, and an electrode leading layer formed on the solid electrolyte layer. The electrode leading layer includes, for example, a carbon layer, and a silver paste layer formed on the carbon layer. The electrode leading layer significantly affects the ESR (equivalent series resistance) of the electrolytic capacitor. PTL 1 discloses an improved carbon layer.

CITATION LIST

Patent Literature

[PTL 1] WO 2019/167774

SUMMARY OF INVENTION

Technical Problem

The ESR may not be sufficiently reduced by using the carbon layer described in PTL 1.

Solution to Problem

A first aspect of the present invention relates to a capacitor element. The capacitor element includes: a first electrode; a dielectric layer covering at least a portion of the first electrode; and a second electrode covering at least a portion of the dielectric layer, wherein the second electrode includes a solid electrolyte layer, a conductive carbon layer covering at least a portion of the solid electrolyte layer, and a metal paste layer covering at least a portion of the carbon layer, the carbon layer includes flake carbon particles and spherical carbon particles, and a particle diameter of the spherical carbon particles is less than an average major diameter of the flake carbon particles, or greater than or equal to the average major diameter of the flake carbon particles.

A second aspect of the present invention relates to an electrolytic capacitor including the above-described capacitor element.

Advantageous Effects of Invention

According to the present invention, it is possible to reduce the ESR of an electrolytic capacitor.

While the novel features of the invention are set forth in the appended claims, the invention, both as to organization and content, will be better understood and appreciated, along with other objects and features thereof, from the following detailed description taken in conjunction with the drawings.

DESCRIPTION OF EMBODIMENTS

Hereinafter, embodiments of the present invention will be described by way of examples. However, the present invention is not limited to the examples described below. In the following description, lower limit values and upper limit values given as examples for numerical ranges may be freely combined as long as there are no inconsistencies.

One possible reason why the ESR is not sufficiently reduced is because the interface resistance between the layers forming the second electrode is still high. Another possible reason is that a sufficient conductive path is not formed in the carbon layer. In PTL 1, flake carbon particles are blended in the carbon layer. The surface of the carbon layer including flake carbon particles tends to be flat. For this reason, the adhesion between the solid electrolyte layer having irregularities and the carbon layer is reduced, resulting in an increased interface resistance. Furthermore, the adhesion between the carbon layer and the metal paste layer is also likely to be reduced. Additionally, the gaps between the flake carbon particles tend to become large, resulting in an increased bulk resistance (volume resistance).

Capacitor Element

A capacitor element according to the present embodiment includes a first electrode, a dielectric layer covering at least a portion of the first electrode, and a second electrode covering at least a portion of the dielectric layer. The second electrode includes a solid electrolyte layer, a conductive carbon layer covering at least a portion of the solid electrolyte layer, and a metal paste layer covering at least a portion of the carbon layer. The carbon layer includes flake carbon particles and spherical carbon particles. A particle diameter of the spherical carbon particles is less than an average major diameter of the flake carbon particles, or greater than or equal to the average major diameter of the flake carbon particles. In a preferable example, the particle diameter of the spherical carbon particles is different from the average major diameter of the flake carbon particles.

Examples of the capacitor element according to the present embodiment include a first capacitor element and a second capacitor element. In the first capacitor element, the particle diameter of the spherical carbon particles is less than the average major diameter of the flake carbon particles. On the other hand, in the second capacitor element, the particle diameter of the spherical carbon particles is greater than or equal to the average major diameter of the flake carbon particles. In the second capacitor element, the particle diameter of the spherical carbon particles is preferably greater than the average major diameter of the flake carbon particles.

In the carbon layer of the first capacitor element, flake carbon particles and spherical carbon particles having a diameter less than the average major diameter of the flake carbon particles are used in combination. Such small spherical carbon particles (hereinafter referred to as "small carbon particles") can enter the gaps between the flake carbon particles. Accordingly, a continuous conductive path is formed, resulting in a reduced bulk resistance. Furthermore, the small carbon particles roughen the surface of the carbon layer so as to conform to the irregularities of the solid electrolyte layer and the metal paste layer. Accordingly, the adhesion between the layers is increased, resulting in a reduction in the interface resistance between the layers. This makes it possible to reduce the ESR of the electrolytic capacitor, while ensuring the oxygen barrier properties of the flake carbon particles.

In the carbon layer of the second capacitor element, flake carbon particles and spherical carbon particles having a diameter greater than or equal to the average major diameter of the flake carbon particles are used in combination. Such large spherical carbon particles (hereinafter referred to as "large carbon particles") change the orientation of the flake carbon particles. Usually, flake carbon particles tend to be oriented such that the major diameter thereof extends in a planar direction of the carbon layer. Therefore, the surface of the carbon layer tends to be flat. By changing the orientation of the flake carbon particles to cause the flake carbon particles to be orientated also in a direction in which the major diameter direction thereof crosses the planar direction of the carbon layer, or in other words, in the thickness direction, irregularities due to the flake carbon particles and the large carbon particles are formed on the surface of the carbon layer. Accordingly, the surface area of the carbon layer is increased, thus improving the adhesion between the solid electrolyte layer and the metal paste layer. This reduces the interface resistance between the layers. Furthermore, as a result of the flake carbon particles being oriented in the thickness direction, a continuous conductive path in formed in the thickness direction, thus reducing the bulk resistance. This makes it possible to reduce the ESR of the electrolytic capacitor.

A. Capacitor Element

The capacitor element according to the present embodiment includes a first electrode, a dielectric layer, and a second electrode. The second electrode includes a solid electrolyte layer, a carbon layer, and a metal paste layer.

First Electrode

The first electrode includes, as a conductive material, a porous sintered body including a valve metal, or a foil (metal foil) including a valve metal. An electrode wire extends upright from the porous sintered body. The electrode wire is used for connection to a lead terminal. The first electrode is an anode, for example.

Examples of the valve metal include titanium, tantalum, aluminum, and niobium. The first electrode may include one, or two or more of the above-described valve metals. The first electrode may include the valve metal in the form of, for example, an alloy including the valve metal, or a compound including the valve metal.

The thickness of the first electrode formed of the metal foil is not particularly limited, and is, for example, greater than or equal to 15 μm and less than or equal to 300 μm. The thickness of the first electrode formed of the porous sintered body is not particularly limited, and is, for example, greater than or equal to 15 μm and less than or equal to 5 mm Dielectric Layer The dielectric layer is formed, for example, by anodizing the surface of the first electrode by chemical conversion treatment or the like. Therefore, the dielectric layer may include an oxide of a valve metal. For example, the dielectric layer includes aluminum oxide when aluminum is used as the valve metal, and the dielectric layer includes tantalum oxide when tantalum is used as the valve metal. Note that the dielectric layer is not limited thereto, and may include any material as long as it functions as a dielectric.

Second Electrode

The second electrode includes a solid electrolyte layer, a carbon layer, and a metal paste layer. The second electrode is a cathode, for example.

Solid Electrolyte Layer

The solid electrolyte layer is formed so as to cover at least a portion of the dielectric layer. The solid electrolyte layer may be formed so as to cover the entire surface of the dielectric layer. The thickness of the solid electrolyte layer is not particularly limited.

The solid electrolyte layer includes one, or two or more solid electrolyte layers. The solid electrolyte layer is formed of a manganese compound or a conductive polymer, for example. As the conductive polymer, it is possible to use, for example, polypyrrole, polyaniline, polythiophene, polyacetylene, and derivatives thereof. The solid electrolyte layer including the conductive polymer can be formed, for example, by subjecting a raw material monomer to chemical polymerization and/or electrolytic polymerization on the dielectric layer. Alternatively, the solid electrolyte layer can be formed by applying, to the dielectric layer, a solution in which the conductive polymer is dissolved, or a dispersion in which the conductive polymer is dispersed.

Carbon Layer

The carbon layer is conductive, and covers at least a portion of the solid electrolyte layer.

The carbon layer of the first capacitor element includes the flake carbon particles and the small carbon particles. The inclusion of the flake carbon particles improves the oxygen barrier properties of the carbon layer. The inclusion of the small carbon particles increases the density of the carbon particles in the carbon layer, and a conductive path is likely to be connected easily. Furthermore, the small carbon particles easily enter the gaps between the flake carbon particles, between the flake carbon particles and the solid electrolyte layer, and between the flake carbon particles and the metal paste layer, and therefore the interface resistance between the layers is reduced. In addition, the small carbon particles are less likely to prevent the major diameter direction of the flake carbon particles to be oriented in the planar direction of the carbon layer. When the major diameter direction of the flake carbon particles is oriented in the planar direction of the carbon layer, the oxygen barrier properties of the carbon layer is likely to be further enhanced.

The carbon layer of the second capacitor element includes the flake carbon particles and the large carbon particles. As a result of the large carbon particles causing the flake carbon particles to be oriented in the thickness direction, irregularities are formed on the surface of the carbon layer, resulting in an increase in adhesion between the layers. Furthermore, the conductive path in the carbon layer in the thickness direction is likely to be connected easily.

As viewed in cross section in the thickness direction of the carbon layer, the flake carbon particles are flat particles. The aspect ratio of the flake carbon particles is greater than or equal to 1.5. In other words, carbon particles having an aspect ratio of greater than or equal to 1.5 are the flake carbon particles.

As viewed in cross section in the thickness direction of the carbon layer, spherical carbon particles including the small carbon particles and spherical carbon particles including the large carbon particles are both spherical particles. The aspect ratio of the spherical carbon particles is less than 1.5. In other words, carbon particles having an aspect ratio of less than 1.5 and having a particle diameter less than an average major diameter Df of the flake carbon particles are the small carbon particles. Carbon particles having an aspect ratio of less than 1.5 and having a particle diameter greater than or equal to the average major diameter Df of the flake carbon particles are the large carbon particles.

The aspect ratio of the carbon particles can be determined from an electron micrograph of a cross section of the carbon layer in the following manner. First, the electron micrograph is binarized such that carbon particles and a binder resin can be distinguished from one another, or ternarized such that carbon particles, a binder resin, and voids can be distinguished from one another. Then, for each of the carbon particles in the observation field of view, a maximum diameter D1 and a diameter D2 in a direction orthogonal to the maximum diameter D1 are measured. Then, the aspect ratio of the particles is calculated by dividing D1 by D2.

Carbon particles having an aspect ratio of greater than or equal to 1.5 are classified as the flake carbon particles. Carbon particles having an aspect ratio of less than 1.5 are classified as the spherical carbon particles. If there is only one carbon particle that is classified as the flake carbon particle or the spherical carbon particle, another electron micrograph is observed, and classification is performed in the same manner.

The average aspect ratio of the flake carbon particles is preferably greater than or equal to 2. The average aspect ratio of the spherical carbon particles is preferably less than or equal to 1.3.

The average major diameter Df of the flake carbon particles is an average value of the maximum diameters D1 of the plurality of flake carbon particles classified as described above. The particle diameter of each of the spherical carbon particles is the diameter of a circle having the same area as the area, in the electron micrograph, of each of the spherical carbon particles classified as described above. When comparing the particle diameter of each of the spherical carbon particles and the average major diameter Df of the flake carbon particles, spherical carbon particles having a particle diameter less than the average major diameter of the flake carbon particles are the small carbon particles. When comparing the particle diameter of each of the spherical carbon particles and the average major diameter Df of the flake carbon particles, carbon particles having a particle diameter greater than or equal to the average major diameter Df of the flake carbon particles are the large carbon particles.

Note that the average major diameter Df of the flake carbon particles is an arithmetic mean of the maximum diameters D1 of 100 arbitrarily selected flake carbon particles. Similarly, the average particle diameter of the spherical carbon particles is an arithmetic mean of the particle diameters of 100 arbitrarily selected spherical carbon particles. For example, an average particle diameter Ds1 of the small carbon particles is an arithmetic mean of the particle diameters of 100 arbitrarily selected small carbon particles. However, an average particle diameter Ds2 of the large carbon particles is an arithmetic mean of the particle diameters of 50 arbitrarily selected large carbon particles.

Hereinafter, the average major diameter Df of the flake carbon particles included in the first capacitor element may be referred to as an "average major diameter Df1", and the average major diameter Df of the flake carbon particles included in the second capacitor element may be referred to as an "average major diameter Df2".

Carbon Particles of Carbon Layer of First Capacitor Element

In the first capacitor element, the average particle diameter Ds1 of the small carbon particles is less than the average major diameter Df1 of the flake carbon particles. In the first capacitor element, Ds1/Df1 is less than 1, and may be less than or equal to 0.8, or less than or equal to 0.6. Ds1/Df1 may be greater than or equal to 0.01, or greater than or equal to 0.05.

The average major diameter Df1 of the flake carbon particles may be greater than or equal to 1.1 times, greater than or equal to 1.2 times, greater than or equal to 2 times, greater than or equal to 5 times, or greater than or equal to 10 times, and less than or equal to 100 times, or less than or equal to 20 times the average major diameter Ds1 of the small carbon particles. By setting the average major diameter Df1 of the flake carbon particles to be greater than or equal to 1.1 times the average particle diameter Ds1 of the small carbon particles, the ESR of the electrolytic capacitor can be particularly reduced.

In the first capacitor element, the average particle diameter Ds1 of the small carbon particles is not particularly limited, as long as it is less than the average major diameter Df1 of the flake carbon particles. The average particle diameter Ds1 of the small carbon particles may be greater than or equal to 0.01 μm and less than or equal to 0.1 μm. When the average particle diameter Ds1 of the small carbon particles is in such a range, the small carbon particles are likely to fill the gaps or the like between the flake carbon particles, so that the conductivity is likely to be improved, and the interface resistance is likely to be reduced. The average particle diameter Ds1 of the small carbon particles may be greater than or equal to 0.02 μm, or greater than or equal to 0.03 μm. The average particle diameter Ds1 of the small carbon particles may be less than or equal to 0.08 μm, or less than or equal to 0.07 μm.

In the first capacitor element, the average major diameter Df1 of the flake carbon particles is not particularly limited, as long as it is greater than the average particle diameter Ds1 of the small carbon particles. The average major diameter Df1 of the flake carbon particles may be greater than or equal to 0.1 μm and less than or equal to 10 μm (e.g., greater than or equal to 0.11 μm and less than or equal to 10 μm).

When the average major diameter Df1 of the flake carbon particles is in such a range, the oxygen barrier properties is likely to be further enhanced. The average major diameter Df1 of the flake carbon particles may be greater than or equal to 0.3 μm, or greater than or equal to 0.5 μm. The average major diameter Df1 of the flake carbon particles may be less than or equal to 5 μm, or less than or equal to 3 μm.

An average particle diameter Da1 of all the spherical carbon particles included in the carbon layer of the first capacitor element is preferably less than the average major diameter Df1 of the flake carbon particles. The average particle diameter Da1 may be in the range illustrated for the average particle diameter Ds1 described above. The ratio between the average particle diameter Da1 and the average major diameter Df1 may be in the range illustrated (the above-described range) for the ratio between the average particle diameter Ds1 and the average major diameter Df1.

Carbon Particles of Carbon Layer of Second Capacitor Element

In the second capacitor element, the average particle diameter Ds2 of the large carbon particles is greater than or equal to the average major diameter Df2 of the flake carbon particles. In the second capacitor element, Ds2/Df2 is greater than or equal to 1, and may be greater than or equal to 1.1, or greater than or equal to 1.2. In the second capacitor element, Ds2/Df2 may be less than or equal to 5, or less than or equal to 2. That is, the average particle diameter Ds2 of the large carbon particles may be greater than or equal to 1.1 times, or greater than or equal to 1.2 times, and less than or equal to 5 times, or less than or equal to 2 times the average major diameter Df2 of the flake carbon particles. By setting the average particle diameter Ds2 of the large carbon particles to be greater than or equal to 1.1 times the average major diameter Df2 of the flake carbon particles, the ESR of the electrolytic capacitor can be particularly reduced.

In the second capacitor element, the average particle diameter Ds2 of the large carbon particles is not particularly limited, as long as it is greater than or equal to the average major diameter Df2 of the flake carbon particles. The average particle diameter Ds2 of the large carbon particles may be greater than or equal to 0.8 μm, or greater than or equal to 1 μm. When the average particle diameter Ds2 is in such a range, the orientation of the flake carbon particles can be effectively changed. The average particle diameter Ds2 of the large carbon particles may be less than or equal to 5 μm, less than or equal to 3 μm, or less than or equal to 2 μm. The average particle diameter Ds2 of the large carbon particles may be greater than or equal to 1 μm and less than or equal to 5 μm.

In the second capacitor element, the average major diameter Df2 of the flake carbon particles is not particularly limited, as long as it is less than or equal to the average particle diameter Ds2 of the large carbon particles. The average major diameter Df2 of the flake carbon particles may be greater than or equal to 0.1 μm, or greater than or equal to 0.3 μm. When the average major diameter Df2 of the flake carbon particles is in such a range, the flake carbon particles are likely to be oriented in the thickness direction. The average major diameter Df2 of the flake carbon particles may be greater than or equal to 0.5 μm, or greater than or equal to 0.8 μm. The average major diameter Df2 of the flake carbon particles may be less than or equal to 1 μm, or less than or equal to 0.9 μm. The average major diameter Df2 of the flake carbon particles may be greater than or equal to 0.1 μm and less than or equal to 1 μm (e.g., greater than or equal to 0.1 μm and less than or equal to 0.9 μm).

An average particle diameter Da2 of all the spherical carbon particles included in the carbon layer of the second capacitor element is preferably greater than or equal to the average major diameter Df2 of the flake carbon particles. The average particle diameter Da2 may be in the range illustrated for the average particle diameter Ds2 described above. The ratio between the average particle diameter Da2 and the average major diameter Df2 may be in the range illustrated (the above-described range) for the ratio between the average particle diameter Ds2 and the average major diameter Df2.

In each of the first and second capacitor elements, the content (mass %) of the carbon particles in the carbon layer is not particularly limited. From the viewpoint of the conductivity, the total content (mass %) of the carbon particles in the carbon layer may be greater than or equal to 60 mass %, or greater than or equal to 70 mass %. The total content ratio of the carbon particles in the carbon layer may be less than 100 mass %, or less than or equal to 99 mass %.

The content ratio of the carbon particles in the carbon layer can be determined from a cross section of the carbon layer in the thickness direction. For example, an electron micrograph of a cross section of the carbon layer is binarized or ternarized as described above. Then, the area ratio of all the carbon particles in the observation field of view is calculated. The calculated area ratio can be regarded as the mass ratio of all the carbon particles in the carbon layer.

From the viewpoint of the oxygen barrier properties, in the first capacitor element, the content (mass %) of the small carbon particles in the carbon layer may be less than the content (mass %) of the flake carbon particles in the carbon layer. The mass of the small carbon particles in the carbon layer may be greater than or equal to 1% and less than 50% of the total mass of the flake carbon particles and the small carbon particles in the carbon layer. The mass of the small carbon particles in the carbon layer may be greater than or equal to 5%, or greater than or equal to 10% of the above-described total mass. The mass of the small carbon particles in the carbon layer may be less than or equal to 40%, or less than or equal to 35% of the above-described total mass.

From the viewpoint of the oxygen barrier properties, in the second capacitor element, the content (mass %) of the large carbon particles in the carbon layer may be less than the content (mass %) of the flake carbon particles in the carbon layer. The mass of the large carbon particles in the carbon layer may be greater than or equal to 1% and less than 50% of the total mass of the flake carbon particles and the large carbon particles in the carbon layer. The mass of the large carbon particles in the carbon layer may be greater than or equal to 3%, or greater than or equal to 5% of the above-described total mass. The mass ratio of the large carbon particles in the carbon layer may be less than or equal to 40%, or less than or equal to 35% of the above-described total mass.

The mass ratio of the small carbon particles in the carbon layer, and the mass ratio of the large carbon particles in the carbon layer can also be determined from a cross section of the carbon layer in the thickness direction. In an electron micrograph of a cross section of the carbon layer that has been binarized or ternarized as described above, the small carbon particles or the large carbon particles are identified, and the area ratio thereof in the observation field of view is calculated. The calculated area ratio of the small carbon particles can be regarded as the mass ratio of the small carbon particles in the carbon layer. The calculated area ratio of the large carbon particles can be regarded as the mass ratio of the large carbon particles in the carbon layer. In addition, the mass ratio of the spherical carbon particles and the other carbon particles (e.g., the flake carbon particles) can be determined from the area ratio of the spherical carbon particles (the large carbon particles and/or the small carbon particles) and the area ratio of the other carbon particles (e.g., the flake carbon particles).

The mass ratio of the large carbon particles (or the small carbon particles) in the carbon layer can also be determined by the following method. For example, the carbon layer is dissolved in a suitable solvent, and the carbon particles are extracted by a known operation such as centrifugal separation. From the extracted carbon particles, the flake carbon particles and the large carbon particles (or the small carbon particles) are separated using the aspect ratio and the particle diameters, and the respective masses thereof are measured. The measured mass of the large carbon particles (or the small carbon particles) is divided by the total mass of the flake carbon particles and the large carbon particles (or the small carbon particles). The obtained value is the mass ratio of the large carbon particles.

Note that the mass ratio of all the spherical carbon particles in the carbon layer can also be determined by the above-described method. The relationship (ratio) between the mass of all the spherical carbon particles in the carbon layer and the mass of the flake carbon particles in the carbon layer may be the same as the relationship illustrated for the relationship between the mass of the small carbon particles in the carbon layer and the mass of the flake carbon particles in the carbon layer. For example, the mass of all the spherical carbon particles in the carbon layer may be greater than or equal to 1% and less than 50% of the total mass of the flake carbon particles and all the spherical carbon particles in the carbon layer.

The carbon layer of the first capacitor element may include third carbon particles (e.g., spherical carbon particles having a diameter greater than or equal to the major diameter of the flake carbon particles) other than the above-described particles. However, the mass ratio of the third carbon particles is desirably less than or equal to 10 mass % of all the carbon particles. In the carbon layer of the first capacitor element, the ratio of the small carbon particles in all the spherical carbon particles is preferably greater than or equal to 90 mass % (e.g., greater than or equal to 95 mass %). In the carbon layer of the first capacitor element, all the spherical carbon particles may be the small carbon particles.

The carbon layer of the second capacitor element may include third carbon particles (e.g., spherical carbon particles having a diameter less than the major diameter of the flake carbon particles) other than the above-described particles. However, the mass ratio of the third carbon particles is desirably less than or equal to 10 mass % of all the carbon particles. In the carbon layer of the second capacitor element, the ratio of the large carbon particles in all the spherical carbon particles is preferably greater than or equal to 90 mass % (e.g., greater than or equal to 95 mass %). In the carbon layer of the second capacitor element, all the spherical carbon particles may be the large carbon particles.

The type of the carbon material forming the carbon particles is not particularly limited. Examples of the carbon material include graphite, graphene, carbon black, soft carbon, and hard carbon. As the graphite, a carbon material having a graphite crystal structure is used, and either artificial graphite or natural graphite may be used. Carbon nanotube, carbon fibers, or the like may be used as the carbon material. Carbon nanotube and a fibrous carbon material such as carbon fibers may be a material cut into a suitable length (e.g., including a ground material). These carbon materials may be used alone or in a combination of two or more. Carbon materials having high crystallinity, such as graphite and graphene, tend to take a flake form.

From the viewpoint of the conductivity, the carbon particles preferably have a crystal structure. As described above, the flake carbon particles are often formed of a carbon material having high crystallinity. For this reason, it is preferable to use a carbon material having high crystallinity, especially for the small carbon particles and the large carbon particles. At least some of the spherical carbon particles included in the carbon layer preferably have a crystal structure. In the carbon layer of the first capacitor element, at least some of the small carbon particles preferably have a crystal structure. In the carbon layer of the second capacitor element, at least some of the large carbon particles preferably have a crystal structure. Examples of the carbon material having high crystallinity include, in addition to graphite and graphene, carbon black that has been graphitized by heat treatment or the like.

The crystallinity of the carbon particles can be confirmed, for example, from, a Raman spectrum obtained by Raman spectroscopy. It can be said that, in a Raman spectrum, the smaller the ratio D/G between a peak intensity D of a D band appearing in the vicinity of 1270 to 1450 $cm^{-1}$ and a peak intensity G of a G band appearing in the vicinity of 1580 $cm^{-1}$, the higher the crystallinity of the carbon particles is. The G band is a peak derived from a graphite structure, and the D band is a peak derived from a structural defect. According to the Raman spectroscopy, any carbon particles in the carbon layer can be irradiated with monochromatic light, and the Raman spectrum of the carbon particles can be evaluated.

The bulk resistance of the carbon layer is reduced by using carbon particles having a D/G in a Raman spectrum of less than 1, in particular, less than or equal to 0.8. Accordingly, the ESR of an electrolytic capacitor including such a carbon layer is reduced. The reduction in bulk resistance can be demonstrated by the following experimental examples.

Experimental Examples

Using spherical carbon particles A (diameter: 40 nm) having a D/G of less than or equal to 0.8, and spherical carbon particles B (diameter: 60 nm) having a D/G greater than 0.8, 20 carbon layers of each type of the particles were produced, and the bulk resistances thereof were measured. Each of the carbon layers was produced by applying, onto a polyester film, a dispersion in which the corresponding type of carbon particles were dispersed in water, followed by drying. The bulk resistances were measured under an environment at 20° C. using an LCR meter for 4-terminal measurement, and the average value thereof was determined. The bulk resistance of the carbon layers produced using the spherical carbon particles A was reduced by about 40% relative to the bulk resistance of the carbon layers produced using the spherical carbon particles B.

The thickness of the carbon layer is not particularly limited. The average thickness of the carbon layer is, for example, greater than or equal to 0.01 μm (or greater than or equal to 0.1 μm) and less than or equal to 50 μm. The average thickness can be determined, for example, by measuring the thicknesses of the carbon layer at a plurality of locations (e.g., 10 locations) in an electron micrograph of a cross section of the carbon layer in the thickness direction, and averaging the thicknesses.

The carbon layer may include a binder resin and/or an additive as necessary. The binder resin is not particularly limited, and examples thereof include known binder resins used for producing capacitor elements. Examples of the binder resin include thermoplastic resins (a polyester resin, etc.) and thermosetting resins, which will be described below. Examples of the additive include a dispersing agent, a surfactant, an antioxidant, a preservative, a base, and/or an acid.

Metal Paste Layer

The metal paste layer covers at least a portion of the carbon layer. The metal paste layer includes a metal material. The metal material is not particularly limited. From the viewpoint of the conductivity, the metal material may include silver.

The shape of the metal material is not particularly limited. The metal material may include spherical and/or flake metal particles. The average aspect ratio of the spherical metal particles (hereinafter referred to as spherical particles) is, for example, less than 1.5. The average aspect ratio of the flake metal material is, for example, greater than or equal to 1.5, or greater than or equal to 2. From the viewpoint of densely disposing the metal material in the metal paste layer, the metal material preferably includes the spherical particles.

The metal paste layer may further include a binder resin. The binder resin is not particularly limited, and it is possible to use any of the same binder resins as those illustrated for the carbon layer. From the viewpoint of the conductivity, the content of the metal material in the silver paste layer may be greater than or equal to 50 mass %, or greater than or equal to 70 mass %.

The thickness of the metal paste layer is not particularly limited. The average thickness of the metal paste layer may be, for example, greater than or equal to 0.1 μm and less than or equal to 50 μm, or greater than or equal to 1 μm and less than or equal to 20 μm. The average thickness can be determined, for example, by measuring the thicknesses of the metal paste layer at a plurality of locations (e.g., 10 locations) in an electron micrograph of a cross section of the metal paste layer in the thickness direction, and averaging the thicknesses.

Figure 1A:
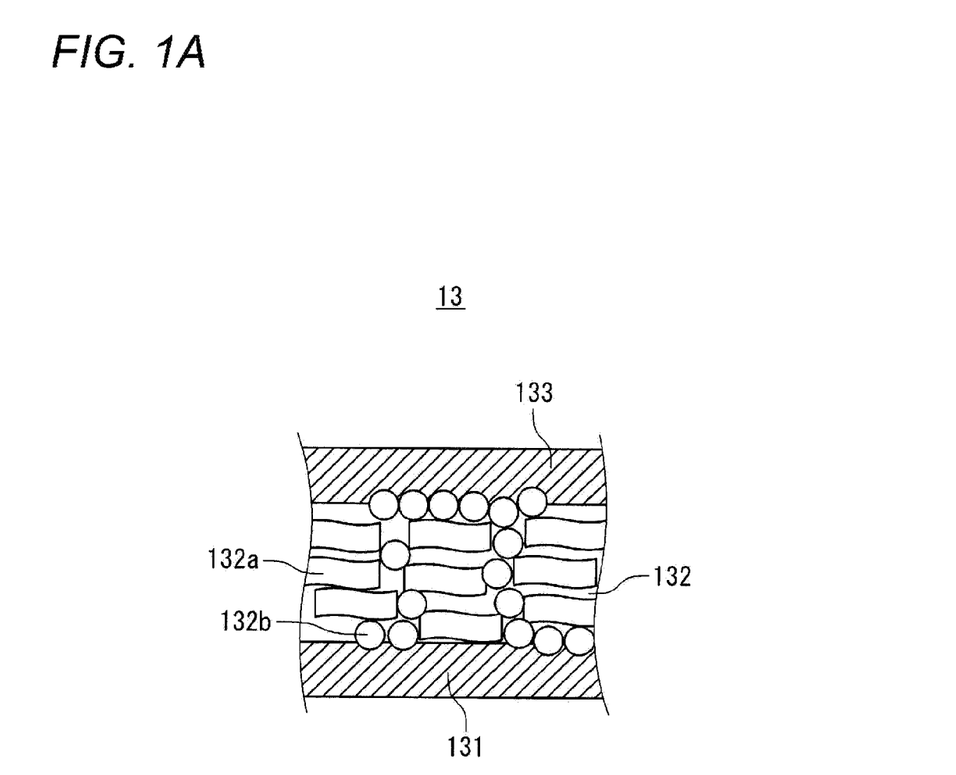
FIG. 1A is a cross-sectional view schematically showing relevant parts of a second electrode according to one embodiment of the present invention.

FIG. 1A is a cross-sectional view showing relevant parts of an exemplary second electrode of a first capacitor element according to the present embodiment. A second electrode 13 includes a solid electrolyte layer 131, a carbon layer 132, and a metal paste layer 133. The carbon layer 132 includes flake carbon particles 132a and small carbon particles 132b. The carbon layer 132 further includes a binder resin (not shown). The small carbon particles 132b also enter the gaps between the flake carbon particles 132a, between the flake carbon particles 132a and the solid electrolyte layer 131, and between the flake carbon particles 132a and the metal paste layer 133.

Figure 1B:
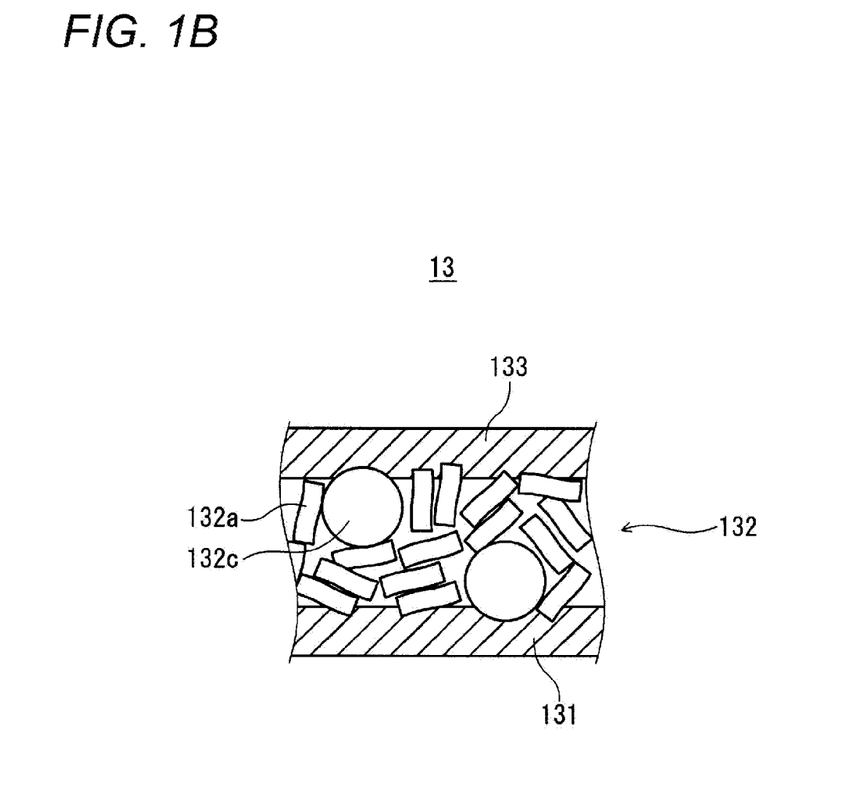
FIG. 1B is a cross-sectional view schematically showing relevant parts of a second electrode according to another embodiment of the present invention.

FIG. 1B is a cross-sectional view showing relevant parts of an exemplary second electrode of a second capacitor element according to the present embodiment. A second electrode 13 includes a solid electrolyte layer 131, a carbon layer 132, and a metal paste layer 133. The carbon layer 132 includes flake carbon particles 132a and large carbon particles 132c. The carbon layer 132 further includes a binder resin (not shown). The large carbon particles 132c also enter the gaps between the flake carbon particles 132a, between the flake carbon particles 132a and the solid electrolyte layer 131, and between the flake carbon particles 132a and the metal paste layer 133.

Figure 2:
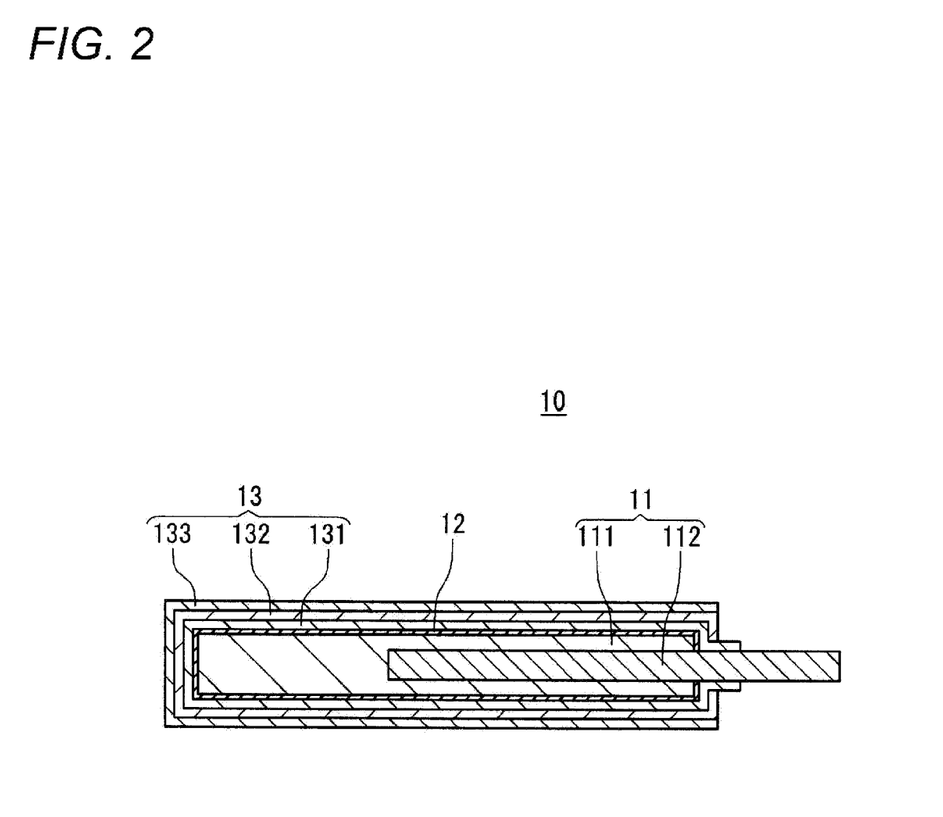
FIG. 2 is a cross-sectional view schematically showing a capacitor element according to one embodiment of the present invention.

FIG. 2 is a cross-sectional view schematically showing a capacitor element according to the present embodiment. A capacitor element 10 includes a first electrode 11, a dielectric layer 12 covering at least a portion of the first electrode 11, and a second electrode 13 covering at least a portion of the dielectric layer 12. The first electrode 11 includes a porous sintered body 111, and an electrode wire 112 extending upright from the porous sintered body 111. The second electrode 13 includes a solid electrolyte layer 131, a carbon layer 132, and a metal paste layer 133. Such a capacitor element 10 has a substantially cubic shape. The capacitor element 10 is the first capacitor element or the second capacitor element.

B. Electrolytic Capacitor

The electrolytic capacitor according to the present embodiment includes the first capacitor element or the second capacitor element described above. In the present specification, an electrolytic capacitor including the first capacitor element may be referred to as a first electrolytic capacitor, and an electrolytic capacitor including the second capacitor element may be referred to as a second electrolytic capacitor. The electrolytic capacitor need only include at least one of the above-described capacitor elements, and may include a plurality of the above-described capacitor elements. The number of capacitor elements included in the electrolytic capacitor may be determined according to the use. Also, the electrolytic capacitor may further include a known capacitor element other than the above-described capacitor elements.

The electrolytic capacitor includes, for example, the above-described capacitor element, an outer package that seals the capacitor element, a first lead terminal, and a second lead terminal. At least a portion of each of the lead terminals is exposed from the outer package.

Lead Terminals

The materials of the first lead terminal and the second lead terminal are not particularly limited as long as the materials are electrochemically and chemically stable, and have conductivity, and they may be either a metal or a nonmetal. The shapes thereof are also not particularly limited.

The first lead terminal is connected to the first electrode, and the second lead terminal is connected to the second electrode. The electrical connection between the first electrode and the first lead terminal is achieved, for example, by welding the first electrode and the first lead terminal. The electrical connection between the second electrode and the second lead terminal is achieved, for example, by bonding the second electrode and the second lead terminal via a conductive bonding layer.

Outer Package

The outer package covers the capacitor element and at least a portion of each of the lead terminals. Thus, the first lead terminal and the second lead terminal are electrically insulated from each other, and the capacitor element is protected.

The outer package is formed of an insulating material (outer package material). The outer package material includes, for example, a cured product of a thermosetting resin, and engineering plastics. Examples of the thermosetting resin include an epoxy resin, a phenol resin outer package material, a silicone resin, a melamine resin, a urea resin, an alkyd resin, polyurethane, and an unsaturated polyester. The engineering plastics include general-purpose engineering plastics and super engineering plastics. Examples of the engineering plastics include polyimide and polyamide imide. The outer package material may include a filler, a curing agent, a polymerization initiator, and/or a catalyst, for example.

Figure 3:
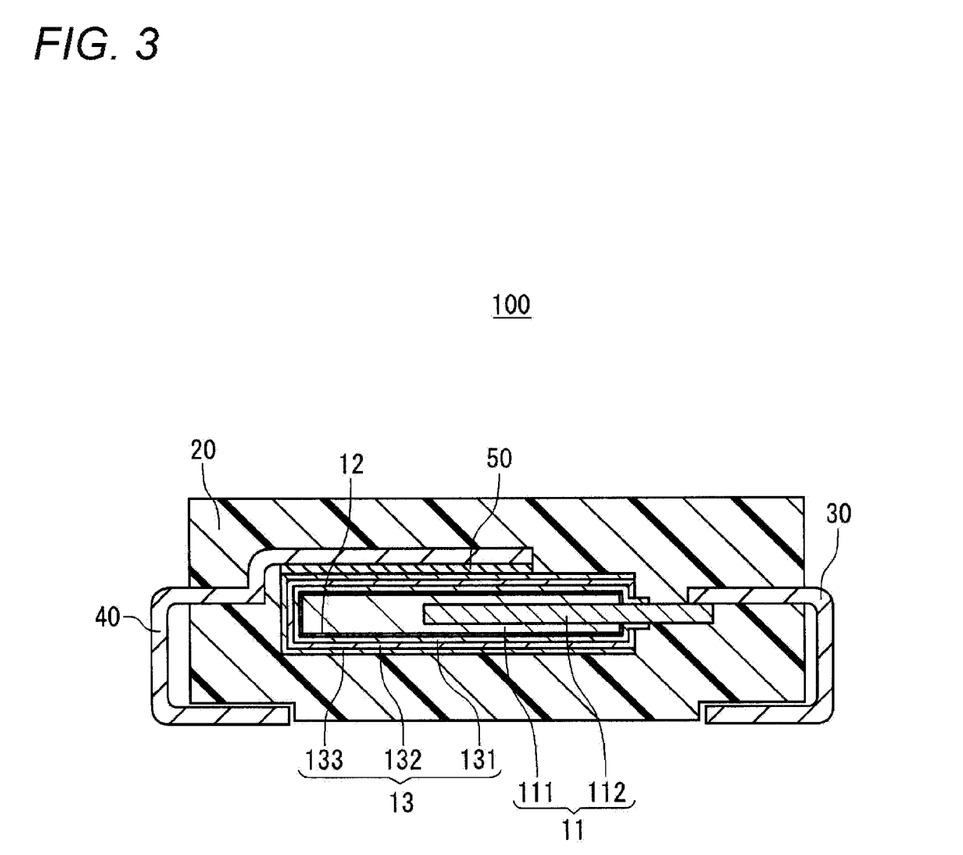
FIG. 3 is a cross-sectional view schematically showing an electrolytic capacitor according to one embodiment of the present invention.

FIG. 3 is a cross-sectional view schematically showing a structure of the electrolytic capacitor according to the present embodiment.

An electrolytic capacitor 100 includes a capacitor element 10, an outer package 20 that seals the capacitor element 10, and a first lead terminal 30 and a second lead terminal 40 each of which is at least partially exposed to the outside of the outer package An electrode wire 112 and the first lead terminal 30 are electrically connected to each other by welding, for example. A second electrode 13 and the second lead terminal 40 are electrically connected to each other via a bonding layer 50 formed of, for example, a conductive adhesive (e.g., a mixture of a thermosetting resin, carbon particles, and metal particles).

Manufacturing Method of Capacitor Element

The above-described capacitor element can be manufactured by a method including, for example, the steps of: forming a dielectric layer covering at least a portion of a first electrode; forming a solid electrolyte layer covering at least a portion of the dielectric layer; forming a carbon layer by attaching a carbon paste to at least a portion of the solid electrolyte layer; and forming a metal paste layer by attaching a metal paste including a metal material to at least a portion of the carbon layer. In the case of manufacturing the first capacitor element, the carbon paste includes the flake carbon particles and the small carbon particles. In the case of manufacturing the second capacitor element, the carbon paste includes the flake carbon particles and the large carbon particles.

(1) Step of Forming Dielectric Layer on First Electrode

The first electrode is formed, for example, by molding a powder of a valve metal into a desired shape (e.g., a block shape) to obtain a molded article, and thereafter sintering the molded article. The first electrode has a porous structure. Also, the first electrode can be prepared by roughening the surface of a foil-like or plate-like base material including a valve metal. The roughening may be performed in any manner as long as irregularities can be formed on the surface of the base material, and may be performed, for example, by etching (e.g., electrolytically etching) the surface of the base material.

The dielectric layer is formed, for example, by anodizing the first electrode. The anodization can be performed by a known method, including, for example, chemical conversion treatment or the like. The chemical conversion treatment can be performed, for example, by immersing the first electrode in a chemical formation solution to impregnate the surface of the first electrode with the chemical formation solution, and applying a voltage between the first electrode serving as an anode and a cathode immersed in the chemical formation solution.

(2) Step of Forming Solid Electrolyte Layer

The solid electrolyte layer can be formed by attaching, for example, a treating liquid including a conductive polymer to the first electrode with the dielectric layer formed thereon, followed by drying. The treating liquid may further include another component such as a dopant. As the conductive polymer, poly(3,4-ethylenedioxythiophene) (PEDOT) is used, for example. As the dopant, polystyrene sulfonic acid (PSS) is used, for example. The treating liquid is a dispersion or a solution of the conductive polymer, for example. Examples of the dispersing medium (solvent) include water, an organic solvent, or a mixture thereof. The solid electrolyte layer may be formed by subjecting a raw material monomer of the conductive polymer to chemical polymerization and/or electrolytic polymerization on the dielectric layer.

(3) Formation of Carbon Layer

The carbon layer is formed on at least a portion of the solid electrolyte layer. The carbon layer is formed using a carbon paste. In the case of manufacturing the first capacitor element, the carbon paste includes the flake carbon particles, the small carbon particles, and a dispersing medium. In the case of manufacturing the second capacitor element, the carbon paste includes the flake carbon particles, the large carbon particles, and a dispersing medium. Water, an organic medium, or a mixture thereof is used as the dispersing medium. The carbon paste may include the binder resin and/or the additive described above, as necessary.

The mass ratio of all the carbon particles included in the carbon paste is, for example, greater than or equal to 60%, and may be greater than or equal to 70%. The mass ratio of all the carbon particles is, for example, less than or equal to 99 mass %. The above-described mass ratio is the ratio of the mass of all the carbon particles to the mass of the carbon paste excluding the dispersing medium. In the case of manufacturing the first capacitor element, the small carbon particles are preferably blended such that the mass thereof is greater than or equal to 1% and less than 50% of the total mass of the flake carbon particles and the small carbon particles. In the case of manufacturing the second capacitor element, the large carbon particles are preferably blended such that the mass thereof is greater than or equal to 1% and less than 50% of the total mass of the flake carbon particles and the large carbon particles.

The method for attaching the carbon paste to the solid electrolyte layer is not particularly limited. For example, the first electrode including the solid electrolyte layer may be immersed in the carbon paste, or the carbon paste may be applied to the surface of the solid electrolyte layer using a known coater or the like. After being applied, the carbon paste may be further heated. The heating temperature is, for example, greater than or equal to 150° C. and less than or equal to 300° C.

(4) Step of Forming Metal Paste Layer

The metal paste is attached to at least a portion of the carbon layer. Thus, a metal paste layer is formed. Alternatively, after being attached, the metal paste is dried and/or heated, to form a metal paste layer.

The method for attaching the metal paste to the carbon layer is not particularly limited. For example, the metal paste may be applied to the surface of the carbon layer using a known coater or the like, or may be attached to the surface of the carbon layer by an ink-jet method. Alternatively, the first electrode including the carbon layer may be immersed in the metal paste.

The metal paste includes a metal material, and may include a binder resin, a dispersing medium, an additive, and so forth as necessary. Examples of the dispersing medium include water, an organic medium, and a mixture thereof.

The mass ratio of the metal material included in the metal paste is preferably greater than or equal to 30%. The mass ratio of the metal material included in the metal paste may be greater than or equal to 80%, or greater than or equal to 90%. The above-described mass ratio is the ratio of the mass of the metal material to the mass of the metal paste excluding the dispersing medium.

The first electrode with the metal paste attached thereto may be dried and/or heated. Thus, the dispersing medium is removed. In the case of using a thermosetting resin as the binder resin, the binder resin is cured by heating, to give a cured product of the metal paste. The heating conditions are not particularly limited, and may be set as appropriate taking into account, for example, the boiling point of the dispersing medium and the curing temperature of the thermosetting resin. The heating temperature is, for example, greater than or equal to 80° C. and less than or equal to 250° C. The heating time is, for example, greater than or equal to 10 seconds and less than or equal to 60 minutes.

(5) Step of Joining Lead Terminals

The first lead terminal and the second lead terminal are disposed at predetermined positions. At this time, a conductive adhesive material is applied to a predetermined of the second electrode. The capacitor element is placed on the lead terminals disposed at the predetermined positions. Subsequently, the electrode wire and the vicinity of one end of the first lead terminal are joined to each other by laser welding, resistance welding, or the like. At this time, the vicinity of one end of the second lead terminal is joined to the second electrode via the conductive adhesive material.

(6) Sealing Step

The capacitor element and a portion of each of the lead terminals may be sealed by a sealing resin. The sealing is performed using a molding technique such as injection molding, insert molding, and compression molding. For example, using a predetermined mold, a composition including the above-described curable resin or engineering plastics is filled into the mold so as to cover the capacitor element and one end of each of the lead terminals, followed by heating or the like.

EXAMPLES

Hereinafter, the present invention will be specifically described by way of examples and comparative examples. However, the present invention is not limited to the following examples.

Example 1

In Example 1, a plurality of types of electrolytic capacitors including different carbon layers were produced and evaluated. According to the following procedure, 20 pieces of the electrolytic capacitor shown in FIG. 3 were produced for each type of the electrolytic capacitors. The properties of the produced electrolytic capacitors were evaluated. Note that electrolytic capacitors X1 to X4 are the first electrolytic capacitors.

Production of Electrolytic Capacitor X1

(i) Production of Capacitor Element
(i-i) Preparation of First Electrode

Tantalum metal particles were used as the valve metal. The tantalum metal particles were molded into a rectangular parallelepiped shape such that one end of an electrode wire made of tantalum was embedded in the tantalum metal particles, and thereafter the resulting molded article was sintered in a vacuum. Thus, a first electrode was obtained that included a porous sintered body of tantalum, and an electrode wire whose one end was embedded in the porous sintered body and whose remaining portion extends upright from one surface of the porous sintered body.

(i-ii) Formation of Dielectric Layer

The porous sintered body and a portion of the electrode wire were immersed in a chemical conversion tank filled with an aqueous phosphoric acid solution serving as an aqueous electrolytic solution, and the other end of the electrode wire was connected to the porous sintered body in the chemical conversion tank. Then, anodization was performed to form a uniform dielectric layer of tantalum oxide on the surface of the porous sintered body and the surface of the portion of the electrode wire. The anodization was performed on the porous sintered body in 0.1 mass % of an aqueous phosphoric acid solution for 10 hours at a chemical conversion voltage of 10 V and a temperature of 60° C.

(i-iii) Formation of Solid Electrolyte Layer

The porous sintered body with the dielectric layer formed thereon was impregnated with a dispersion including polypyrrole for 5 minutes, and thereafter dried for 30 minutes at 150° C., to form a solid electrolyte layer on the dielectric layer.

(i-iv) Formation of Carbon Layer

A dispersion (carbon paste) in which flake carbon particles (average major diameter: 0.8 μm, graphite, average aspect ratio: 100) and small carbon particles (average particle diameter: 60 nm, graphitized carbon black (D/G=0.5), average aspect ratio: 1.0) were dispersed in water was applied to the solid electrolyte layer, and thereafter heated to 200° C., to form a carbon layer (thickness: about 3 μm) on the surface of the solid electrolyte layer. The content of the flake carbon particles included in the carbon paste was 95 mass %, and the content of the small carbon particles included in the carbon paste was 5 mass %.

(i-v) Formation of Metal Paste Layer

A metal paste including silver particles, a binder resin, and a solvent was applied to the surface of the carbon layer. Thereafter, the metal paste was heated at 200° C., to form a metal paste layer (thickness: 10 μm), thus obtaining a capacitor element.

(ii) Production of Electrolytic Capacitor X1

A conductive adhesive material was applied to the metal paste layer, to join the second lead terminal and the metal paste layer to each other. The electrode wire and the first lead terminal were joined to each other by resistance welding. Subsequently, the capacitor element with the lead terminals joined thereto, and materials (an uncured thermosetting resin and a filler) of an outer package were accommodated in a mold, and the capacitor element was sealed by transfer molding. Thus, an electrolytic capacitor X1 was produced.

Production of Electrolytic Capacitor X2

An electrolytic capacitor X2 was produced in the same manner as the electrolytic capacitor X1 except that the content of the flake carbon particles included in the carbon paste was 85 mass %, and the content of the small carbon particles was 15 mass %.

Production of Electrolytic Capacitor X3

An electrolytic capacitor X3 was produced in the same manner as the electrolytic capacitor X1 except that the content of the flake carbon particles included in the carbon paste was 70 mass %, and the content of the small carbon particles was 30 mass %.

Production of Electrolytic Capacitor X4

An electrolytic capacitor X4 was produced in the same manner as the electrolytic capacitor X1 except that the content of the flake carbon particles included in the carbon paste was 60 mass %, and the content of the small carbon particles was 40 mass %.

Production of Electrolytic Capacitor C1

An electrolytic capacitor C1 of a comparative example was produced in the same manner as the electrolytic capacitor X1 except that a carbon layer having a thickness of about 3 μm was formed using a carbon paste including no small carbon particles.

Production of Electrolytic Capacitor C2

An electrolytic capacitor C2 of a comparative example was produced in the same manner as the electrolytic capacitor X1 except that a carbon layer having an thickness of about 3μm was formed using a carbon paste including no flake carbon particles.

Evaluation

The ESR values of the electrolytic capacitors X1 to X4 and C1 and C2 (20 pieces each) produced as described above were measured. Specifically, the ESR values (mΩ) of each of the electrolytic capacitors at a frequency of 100 kHz were measured under an environment of 20° C., using an LCR meter for 4-terminal measurement. Then, the average value of the measured ESR values was determined. With the average ESR value of the electrolytic capacitor C1 taken as 100%, the average ESR value (relative value) of each of the electrolytic capacitors was determined. Table 1 shows some of the conditions for forming the carbon layer and the average ESR values (relative values).

TABLE 1

| Electrolytic capacitor | Small carbon particles/All carbon particles (mass %) | Flake carbon particles/All carbon particles (mass%) | ESR value (%) |
|---|---|---|---|
| X1 | 5 | 95 | 98 |
| X2 | 15 | 85 | 94 |
| X3 | 30 | 70 | 95 |
| X4 | 40 | 60 | 96 |
| C1 | — | 100 | 100 |
| C2 | 100 | — | 105 |

As shown in Table 1, the ESR values of the first electrolytic capacitors X1 to X4 according to the present invention were lower than the ESR values of the electrolytic capacitors of the comparative examples.

Example 2

In Example 2, a plurality of types of electrolytic capacitors including different carbon layers were produced and evaluated. According to the following procedure, 20 pieces of the electrolytic capacitor shown in FIG. 3 were produced for each type of the electrolytic capacitors. The properties of the produced electrolytic capacitors were evaluated. Note that electrolytic capacitors Y1 to Y4 are the second electrolytic capacitors.

Production of Electrolytic Capacitor Y1

An electrolytic capacitor Y1 was produced in the same manner as the electrolytic capacitor X1 except that the method for forming the carbon layer was changed. For the electrolytic capacitor Y1, the carbon layer of the capacitor element was formed by the following method.

(i-iv) Formation of Carbon Layer of Capacitor Element

A dispersion (carbon paste) in which flake carbon particles (average major diameter: 0.8 μm, graphite, average aspect ratio: 400) and large carbon particles (average particle diameter: 1 μm, graphitized carbon black (D/G=0.8), average aspect ratio: 1.0) were dispersed in water was applied to the solid electrolyte layer, and thereafter heated at 200° C., to form a carbon layer (thickness: about 3 μm) on the surface of the solid electrolyte layer. The content of the flake carbon particles included in the carbon paste was 99 mass %, and the content of the large carbon particles included in the carbon paste was 1 mass %.

Production of Electrolytic Capacitor Y2

An electrolytic capacitor Y2 was produced in the same manner as the electrolytic capacitor Y1 except that the content of the flake carbon particles included in the carbon paste was 97 mass, and the content of the large carbon particles was 3 mass %.

Production of Electrolytic Capacitor Y3

An electrolytic capacitor Y3 was produced in the same manner as the electrolytic capacitor Y1 except that the content of the flake carbon particles included in the carbon paste was 95 mass, and the content of the large carbon particles was 5 mass %.

Production of Electrolytic Capacitor Y4

An electrolytic capacitor Y4 was produced in the same manner as the electrolytic capacitor Y1 except that the content of the flake carbon particles included in the carbon paste was 90 mass, and the content of the large carbon particles was 10 mass %.

Production of Electrolytic Capacitor C3

An electrolytic capacitor C3 of a comparative example was produced in the same manner as the electrolytic capacitor Y1 except that a carbon layer having a thickness of about 3 μm was formed using a carbon paste including no large carbon particles.

Production of Electrolytic Capacitor C4

An electrolytic capacitor C4 of a comparative example was produced in the same manner as the electrolytic capacitor Y1 except that a carbon layer having a thickness of about 3 μm was formed using a carbon paste including no flake carbon particles.

Evaluation

The ESR values of the electrolytic capacitors Y1 to Y4 and C3 and C4 (20 pieces each) produced as described above were measured in the same manner as the method used in Example 1, and the average values thereof were determined. With the average ESR value of the electrolytic capacitor C3 taken as 100%, the average ESR value (relative value) of each of the electrolytic capacitors was determined. Table 2 shows some of the conditions for forming the carbon layer and the average ESR values (relative values).

TABLE 2

| Electrolytic capacitor | Large carbon particles/All carbon particles (mass %) | Flake carbon particles/All carbon particles (mass %) | ESR value (%) |
| --- | --- | --- | --- |
| Y1 | 1 | 99 | 98 |
| Y2 | 3 | 97 | 90 |
| Y3 | 5 | 95 | 92 |
| Y4 | 10 | 90 | 98 |
| — | — | 100 | 100 |
| C4 | 100 | — | 105 |

As shown in Table 2, the ESR values of the second electrolytic capacitors according to the present invention were lower than the ESR values of the electrolytic capacitors of the comparative examples.

INDUSTRIAL APPLICABILITY

The electrolytic capacitors according to the above-described aspects of the present invention each have a reduced ESR. Therefore, the electrolytic capacitors are applicable to various uses that require a low ESR.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

100 . . . Electrolytic capacitor
10 . . . Capacitor element
11 . . . First electrode
   111 . . . Porous sintered body
   112 . . . Electrode wire
12 . . . Dielectric layer
13 . . . Second electrode
   131 . . . Solid electrolyte layer
   132 . . . Carbon layer
      132a . . . Flake carbon particles
      132b . . . Small carbon particles
      132c . . . Large carbon particles
   133 . . . Metal paste layer
20 . . . Outer package
30 . . . First lead terminal
40 . . . Second lead terminal
50 . . . Bonding layer

The invention claimed is:

1. A capacitor element comprising:
a first electrode;
a dielectric layer covering at least a portion of the first electrode; and
a second electrode covering at least a portion of the dielectric layer,
wherein the second electrode includes a solid electrolyte layer, a conductive carbon layer covering at least a portion of the solid electrolyte layer, and a metal paste layer covering at least a
portion of the carbon layer, the carbon layer includes flake carbon particles and spherical carbon particles,
a particle diameter of the spherical carbon particles is less than an average major diameter of the flake carbon particles, or greater than or equal to the average major diameter of the flake carbon particles,
a mass of the spherical carbon particles in the carbon layer is greater than or equal to 1% and less than 50% of a total mass of the flake carbon particles and the spherical carbon particles in the carbon layer, and
a content of carbon particles containing the flake carbon particles and the spherical carbon particles in the carbon layer is greater than or equal to 60 mass %.

2. The capacitor element according to claim 1,
wherein the particle diameter of the spherical carbon particles is less than the average major diameter of the flake carbon particles, and
the average major diameter of the flake carbon particles is greater than or equal to 1.1 times an average particle diameter of the spherical carbon particles.

3. The capacitor element according to claim 2,
wherein the average particle diameter of the spherical carbon particles is greater than or equal to 0.01 μm and less than or equal to 0.1 μm.

4. The capacitor element according to claim 2,
wherein the average major diameter of the flake carbon particles is greater than or equal to 0.11 μm and less than or equal to 10 μm.

5. The capacitor element according to claim 2,
wherein at least some of the spherical carbon particles have a crystal structure.

6. A capacitor element comprising:
a first electrode;
a dielectric layer covering at least a portion of the first electrode; and
a second electrode covering at least a portion of the dielectric layer,
wherein the second electrode includes a solid electrolyte layer, a conductive carbon layer covering at least a portion of the solid electrolyte layer, and a metal paste layer covering at least a portion of the carbon layer,
the carbon layer includes flake carbon particles and spherical carbon particles,
particle diameter of the spherical carbon particles is greater than or equal to an average major diameter of the flake carbon particles,
an average particle diameter of the spherical carbon particles is greater than or equal to 1.1 times the average major diameter of the flake carbon particles, and
a content of carbon particles containing the flake carbon particles and spherical carbon particles in the carbon layer is greater than or equal to 60 mass %.

7. The capacitor element according to claim 6,
wherein a volume of the spherical carbon particles in the carbon layer is greater than or equal to 1% and less than 50% of a total volume of the flake carbon particles and the spherical carbon particles in the carbon layer.

8. The capacitor element according to claim 6,
wherein the average particle diameter of the spherical carbon particles is greater than or equal to 1 μm and less than or equal to 5 μm.

9. The capacitor element according to claim 6,
wherein the average major diameter of the flake carbon particles is greater than or equal to 0.1 μm and less than or equal to 0.9 μm.

10. The capacitor element according to claim 6,
wherein a content of the spherical carbon particles in the carbon layer is less than a content of the flake carbon particles in the carbon layer.

11. The capacitor element according to claim 6,
wherein a mass of the spherical carbon particles in the carbon layer is greater than or equal to 1% and less than 50% of a total mass of the flake carbon particles and the spherical carbon particles in the carbon layer.

12. The capacitor element according to claim 6,
wherein at least some of the spherical carbon particles have a crystal structure.

13. An electrolytic capacitor comprising the capacitor element according to claim 1.

14. An electrolytic capacitor comprising the capacitor element according to claim 6.

* * * * *